April 14, 1925.　　　　　　　　　　　　　　　　1,533,284
A. V. VERVILLE
ANNULAR RADIATOR MOUNTING FOR AIRPLANES
Filed Feb. 17, 1921　　　　3 Sheets-Sheet 1
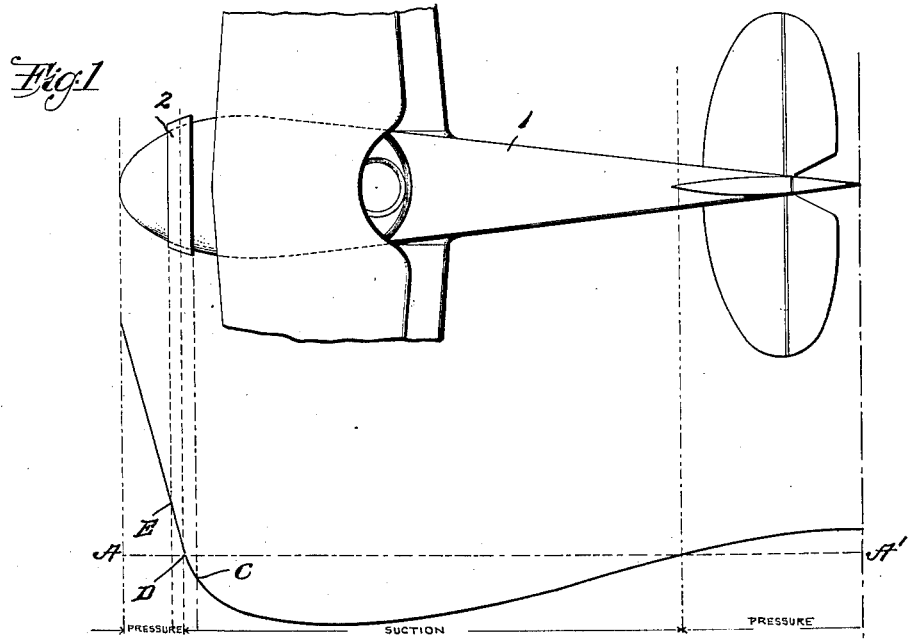
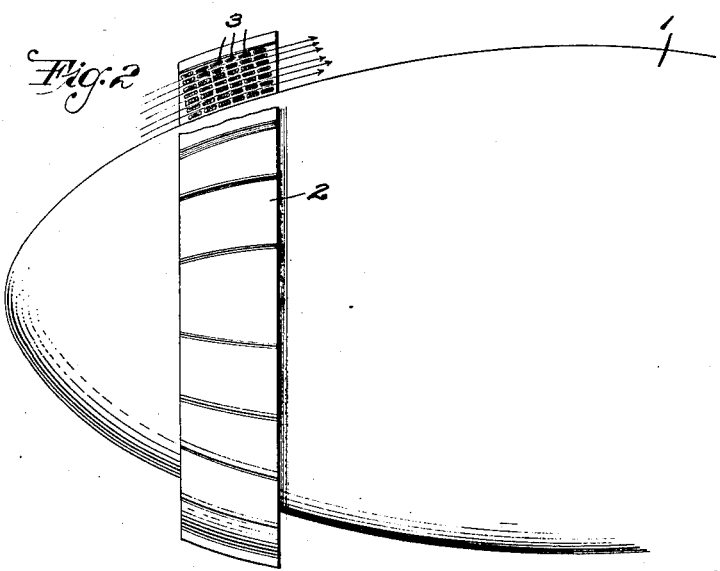
INVENTOR.
BY A. V. Verville
Robert H. Young
ATTORNEY.

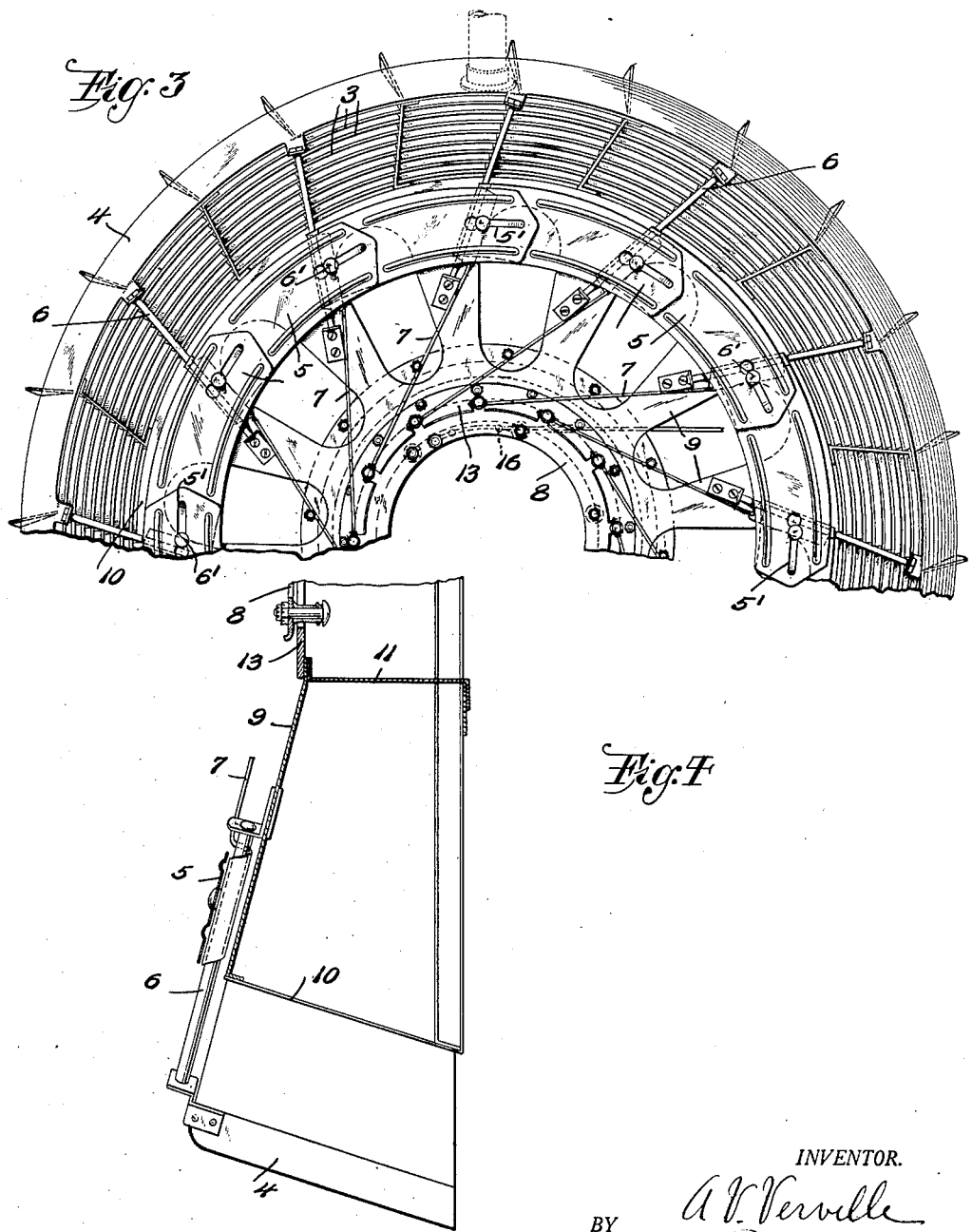

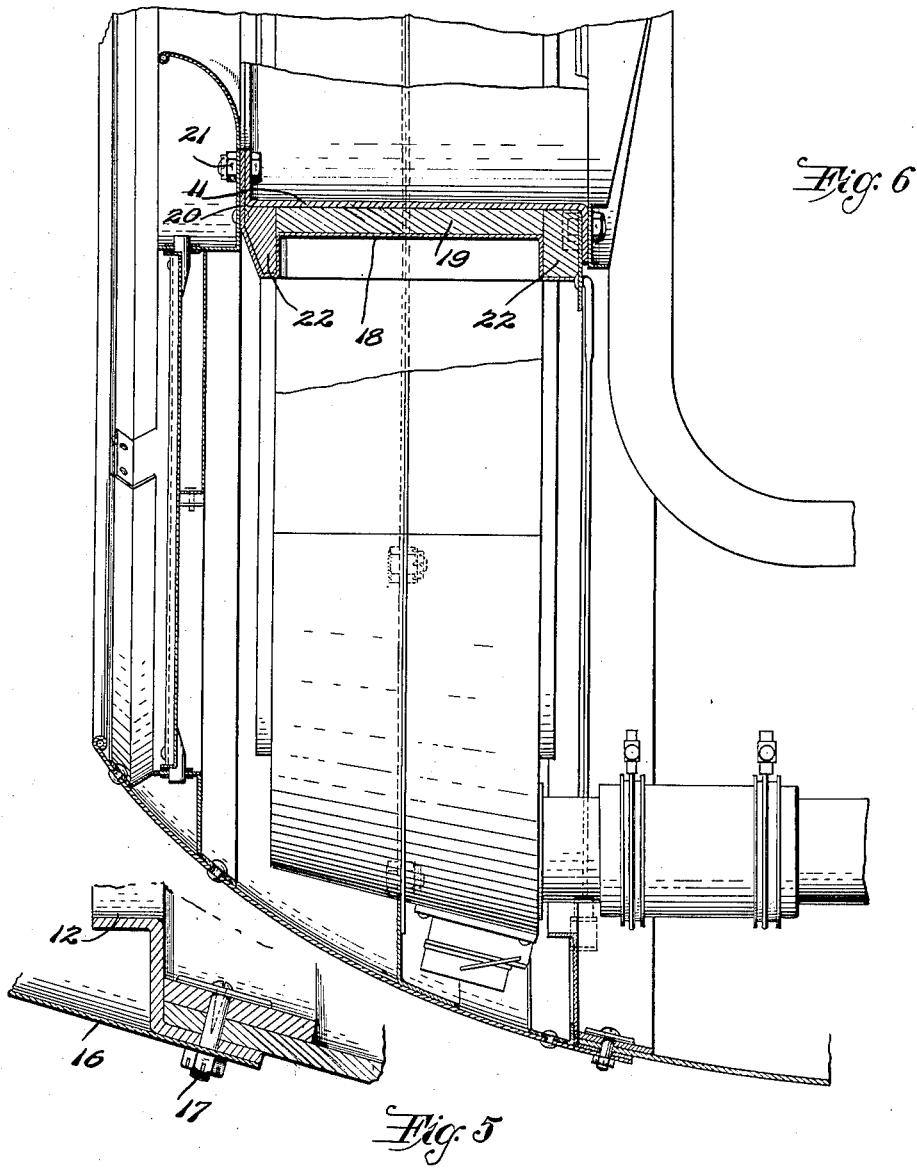

Patented Apr. 14, 1925.

1,533,284

UNITED STATES PATENT OFFICE.

ALFRED V. VERVILLE, OF DAYTON, OHIO.

ANNULAR RADIATOR MOUNTING FOR AIRPLANES.

Application filed February 17, 1921. Serial No. 445,712.

*To all whom it may concern:*

Be it known that I, ALFRED V. VERVILLE, a citizen of the United States, residing at Dayton, in the county of Montgomery and State of Ohio, have invented certain new and useful Improvements in Annular Radiator Mountings for Airplanes, of which the following is a specification.

This invention relates to radiators and especially those which are adapted for use on the fuselages of aircraft of all kinds. The invention relates particularly to the construction of the radiator, the relation thereof to the fuselage of the aircraft, the means providing for variation of the radiator cooling surfaces exposed to the air stream, and the provision whereby the radiator may be removed from the fuselage and replaced by a nose radiator when the latter is required.

In the accompanying drawings:

Fig. 1 is a diagrammatic view illustrating the relation of the radiator to the fuselage of an airplane and indicating high, normal and low pressure regions of the fuselage;

Fig. 2 is an enlarged plan view of the nose portion of the fuselage showing the relation of the radiator thereto, certain parts being in section;

Fig. 3 is an enlarged vertical cross section through the fuselage showing the radiator in front elevation;

Fig. 4 is a diametrical section through the radiator attached to the fuselage;

Fig. 5 is a fragmentary diametrical section through the fuselage, omitting the radiator;

Fig. 6 is a fragmentary diametrical section through the fuselage showing the nose radiator applied.

First, I will consider the disposition of the radiator in relation to the fuselage. It has been found in wind tunnel tests on airplane fuselages that, for a short distance along the nose of the fuselage in flight, there is a region of pressure higher than atmospheric and for a distance aft of said region there is another region or section of pressure less than atmospheric. Hereafter the term "pressure region" shall denote the region of pressure higher than atmospheric and "suction region" shall denote the region of pressure less than atmospheric.

The main consideration in radiator design in an airplane or other type of aircraft is to cause the maximum volume of air to pass through the radiator with the minimum resistance. With this object in mind, I mount a radiator in annular formation with respect to fuselage and at such a position relative to the longitudinal axis of the fuselage that the vertical line of the radiator coincides with a vertical line passing through the point on the longitudinal axis of the fuselage where the pressure of air passing along the contour or outer surface of the fuselage is normal. In this region of normal pressure the flow of air is substantially parallel to the contour or surface of the fuselage and therefore the conditions for air flow through the annular runs or tubes of the radiator which are parallel to the contour of the fuselage are most favorable.

The air inlet of the radiator is in front of the vertical center line of the radiator and the air outlet is in rear thereof. There is a region of pressure in front of said center line since said center line coincides with a point on the longitudinal axis of the fuselage where the pressure changes to suction and in rear of said line there is a region of suction. There is, then, a condition of pressure in the region where the air inlet to the radiator is located and there is likewise a condition of suction in the region where the air outlet of the radiator is located. It is obvious therefore that the flow of air through the radiator must ensue, the radiator being so disposed relatively to the fuselage that the most favorable air flow conditions exist. Stated in a few words, a maximum volume of air will pass through the radiator with a minimum resistance to its flow.

Referring now to Fig. 1, the reference character 1 indicates a typical or conventional airplane stream-line fuselage. The line A—A' which is equal to the length of the fuselage and parallel to its longitudinal axis represents the line of normal or atmospheric pressure. Points above said line represent pressure higher than atmospheric while points below said line represent pressure less than atmospheric, or suction. 2 indicates a radiator of annular formation encircling the fuselage and so arranged that its vertical or fore and aft center line is coincident with a similar line passing through D in pressuregraph or diagram Fig. 1. The lines of flow are indicated in Fig. 1 by dropping perpendiculars to line A—A' through the points of inlet and outlet of air to and from the radiator and in this connection it will be noted that on the inlet side the exists pressure equal to the ordinate E and on the outlet side there exists suction equal to the ordinate C.

The radiator, in its organization, embodies in suitable number annular air tubes 3 surrounded and inclosed by an annular cover or casing 4 which forms the outlet point of the air passageway through the radiator. The lines of air flow are indicated in Fig. 2 where they are seen to pass through the radiator substantially parallel to and concentric with the rows of annular water tubes. Resistance of such flow is therefore at a minimum, providing for a maximum volume of air in a given time.

I will now consider the means provided for the variation of the radiator cooling surface exposed to the air stream and therefore the amount of air permitted to pass through the radiator and impinge against the water tubes thereof. It is well known that such a variation is necessary, due to seasonal changes of temperature and also to various conditions of flight at different altitudes, the temperature of the air steadily decreasing as higher altitudes are attained. 10 represents the inner band or casing of the radiator which is bolted to an annular flange 12 of angular formation in cross section, the latter being bolted to the fuselage structure as shown and forming a permanent anchorage or attachment for the rear portion of the radiator. 11 represents a collar or sleeve fixedly secured to the fuselage and fastened detachably at its front edge to a spider 9 which is in turn bolted to the inner band 10 at the front edge of the latter.

Radially extending guides 6 are fastened at their outer ertremities to the band 4 and at their inner extremities to the arms of the spider 9. An annular shutter composed of a circular series of arcuate shutter segments 5 is provided for the purpose of covering more or less of the radiator tubes and therefore a greater or lesser area of the air inlet to the radiator. The segments 5 are formed with slots 5' to receive headed studs or pins 6' projecting from rings 7' which are arranged to slide in radial paths along the guides 6, thereby enabling all of the shutter sections to move outwardly and inwardly in radial paths.

In order to control or operate the shutter, I provide a shutter control ring 8 which may be partially turned or rotated upon a fixed collar 13 as a track, said collar being fastened in the front support 9 and the supporting disc or collar 11. Mounted upon the fixed collar 13 are anti-friction rollers 15 forming bearings for the control ring 8 which is rotatable around same, said ring in turn being actuated by a flexible cable attached to the control ring 8 at points 16 at opposite sides thereof. Said cable is adapted to be guided to the cock-pit of the aircraft over suitably arranged pulleys or guides (not shown). Tangential to the ring 8 and spaced equally along the periphery thereof are shutter-operating links 7. Said links are in turn attached to the shutter segments 5 by means above described. It will thus be seen that by turning the control ring 8 back and forth the shutter segments are concurrently shifted outwardly and inwardly enabling any desired area of the air inlet space of the radiator to be obstructed for the purpose hereinabove set forth.

It is sometimes desirable to substitute the ordinary nose radiator for the annular radiator hereinabove described and suitable provision is made for such substitution. In order to remove the annular radiator herein shown and described, the following procedure is necessary. The bolts or other fasteners joining inner band 10 with the flange 12 are removed, as are also the bolts or fasteners joining front support 9 with the supporting disc or collar 11. The entire annular radiator structure, together with the shutter system thereof is then removed leaving only the flange 12 and the collar 11 remaining fixed upon the fuselage.

Referring now to Figs. 5 and 6, the outer band of the nose radiator is represented at 16 and is attached to the flange 12 on the fuselage by means of bolts or equivalent fastening means 17. The inner band 18 of such radiator slips over the supporting disc 11 and is separated therefrom by the ground cork gaskets 19 and felt or equivalent washers 22. A retaining ring 20, secured to the supporting disc 11 by fastening means such as bolts 21, overlaps the outer surface of the radiator and holds the radiator securely in position.

What I claim is:

1. In combination with an airplane fuselage of streamline formation, a radiator transversely encircling and projecting beyond the fuselage and having its air inlet and outlet sides arranged respectively in advance and in rear of the line of normal atmospheric pressure on the nose portion of the fuselage.

2. In combination with an airplane fuselage of streamline formation, a radiator transversely encircling and projecting beyond the fuselage and having its air inlet in the region of pressure higher than atmospheric, and its outlet in the region of pressure lower than atmospheric.

3. In combination with an airplane fuselage of streamline formation, a radiator transversely encircling and projecting in annular formation beyond the fuselage and arranged between the pressure and suction areas of the fuselage.

4. In combination with an airplane fuselage of streamline formation, a radiator transversely encircling the fuselage and arranged in the region of minimum head resistance, said radiator embodying air passages which permit the air stream to flow in parallelism to the fuselage contour.

5. In combination with an airplane fuselage of streamline formation, an annular radiator transversely encircling the fuselage and embodying substantially annular air passages, and movable arcuate shutter elements for obstructing one or more of such passages.

6. In combination with an airplane fuselage of streamline formation, a radiator transversely encircling the fuselage and embodying substantially annular air passages, and shutter mechanism for obstructing one or more of such passages comprising shutter segments movable bodily in a radial direction with respect to the center of the radiator, and means for concurrently shifting all of the shutter segments.

7. In combination with an airplane fuselage of streamline formation, a radiator transversely encircling the fuselage and embodying substantially annular air passages, and shutter mechanism for obstructing one or more of such passages comprising shutter segments movable bodily in a radial direction with respect to the center of the radiator, and means for concurrently shifting all of the shutter segments, said means including a shutter segment-actuating ring, and linkages between said ring and shutter segments.

8. In combination with an airplane fuselage, an annular radiator transversely encircling the fuselage, a shutter for obstructing more or less of the air passages of the radiator embodying a plurality of shutter segments movable in paths substantially radial to the center of the radiator, substantially radial guides for the shutter segments, and means for shifting all shutter segments simultaneously.

9. In combination with an airplane fuselage, an annular radiator transversely encircling the fuselage, a shutter for obstructing more or less of the air passages of the radiator embodying a plurality of shutter segments movable in paths substantially radial to the center of the radiator, substantially radial guides for the shutter segments, runners movable along said guides and carrying the shutter segments, and means for shifting all shutter segments simultaneously.

In testimony whereof I have affixed my signature.

ALFRED V. VERVILLE.